United States Patent [19]
Eslambolchi et al.

[11] Patent Number: 5,991,013
[45] Date of Patent: Nov. 23, 1999

[54] CONVEYANCE WARNING MEMBER WITH SACRIFICIAL FIBER

[75] Inventors: Hossein Eslambolchi, Basking Ridge, N.J.; John Sinclair Huffman, McDonough, Ga.

[73] Assignee: AT&T Corp., New York, N.Y.

[21] Appl. No.: 09/179,601

[22] Filed: Oct. 27, 1998

[51] Int. Cl.⁶ ..................................................... G01N 21/00
[52] U.S. Cl. .......................... 356/73.1; 405/157; 324/326
[58] Field of Search ........................... 356/73.1; 405/157, 405/154; 324/326, 510; 385/28, 12, 13, 11

[56] References Cited

U.S. PATENT DOCUMENTS

| | | | |
|---|---|---|---|
| 4,767,237 | 8/1988 | Cosman et al. | 405/157 |
| 4,875,722 | 10/1989 | Gentile | 356/73.1 |
| 4,904,050 | 2/1990 | Dunn et al. | 350/96.29 |
| 5,093,568 | 3/1992 | Maycock | 250/227.14 |

*Primary Examiner*—Robert H. Kim
*Assistant Examiner*—Tu T. Nguyen
*Attorney, Agent, or Firm*—Robert B. Levy

[57] ABSTRACT

A warning tape (10) burial above an underground conveyance (13) includes a sacrificial fiber (12). A monitoring device, such as an AOTDR (25) monitors the sacrificial fiber (12) for damage caused by excavation. Upon detecting such damage, the monitoring indicates both the existence and location of such excavation by triggering a warning (26) to generate an alert, and by providing location information to a display device (32).

11 Claims, 2 Drawing Sheets

5,991,013

CONVEYANCE WARNING MEMBER WITH SACRIFICIAL FIBER

TECHNICAL FIELD

The present invention relates to a system for warning against potential excavation near an existing buried utility conveyance.

BACKGROUND ART

A variety of methods exist for installing a fiber optic cable to protect the cable against vandalism and inadvertent excavation. The most commonly used, most efficient and least costly installation method is to directly bury the cable using a cable plow. The standard installation practice involves putting the cable into the ground inside a protective duct or directly placing the cable into the ground without any protection. After burying the cable, a warning tape, in the form of a plastic ribbon or the like, is buried approximately two feet above the fiber optic cable. The warning tape carries indica identifying the communications cable owner.

The warning tape provides some protection to the buried fiber optic cable by alerting an excavating contractor that a buried communications cable lies in the vicinity of the tape and that great care should be taken while excavating. The warning tape is color-coded to identify the type of buried conveyance. For example, the color orange identifies communications cables. Unfortunately, such warning tapes only convey a passive warning message to an excavating contractor. If a contractor does not see the warning tape, or worse, chooses to ignore it, the contractor's digging equipment can damage the fiber optic cable. It is not unusual for a contractor to see a warning tape only after striking the fiber optic cable. Even if the contractor does not sever the cable, the contractor may expose the cable sheath by simply striking the cable, thereby, allowing the sheath to suffer corrosion to the point of destruction. Unfortunately, many excavating contractors, unless they actually sever the cable, will simply stop their digging once they have struck the cable. Rather than alert the cable owner, most contractors will cover the cable with dirt. Simply covering the struck cable with dirt may damage the fibers because of the movement of the nearby earth.

Thus, there is a need for a warning system to alert owners of other conveyances, such as gas and water lines, electrical and telecommunications cables (including fiber optic cables), of the existence and location of digging activity near their conveyances.

BRIEF SUMMARY OF THE INVENTION

Briefly, in accordance with the present invention, a warning tape for burial above an underground utility conveyance includes a sacrificial fiber that is only monitored for damage and that does not provide utility service, such as carrying actual telecommunications or other traffic. The fiber is monitored on a real time basis to detect changes in the monitoring signal carried by the fiber that indicate the possible existence and location of excavation activity near the conveyance. By monitoring the sacrificial fiber, the conveyance owner can detect actual strikes as well as near-misses. Such information permits the conveyance owner to make repairs and prevent further damage to existing utility conveyances. Alternatively, monitoring the sacrificial fiber permits the conveyance owner to provide an alert to the excavation equipment operator, enabling the operator to stop digging before causing any damage to the conveyance.

DETAILED DESCRIPTION

Figure 1:
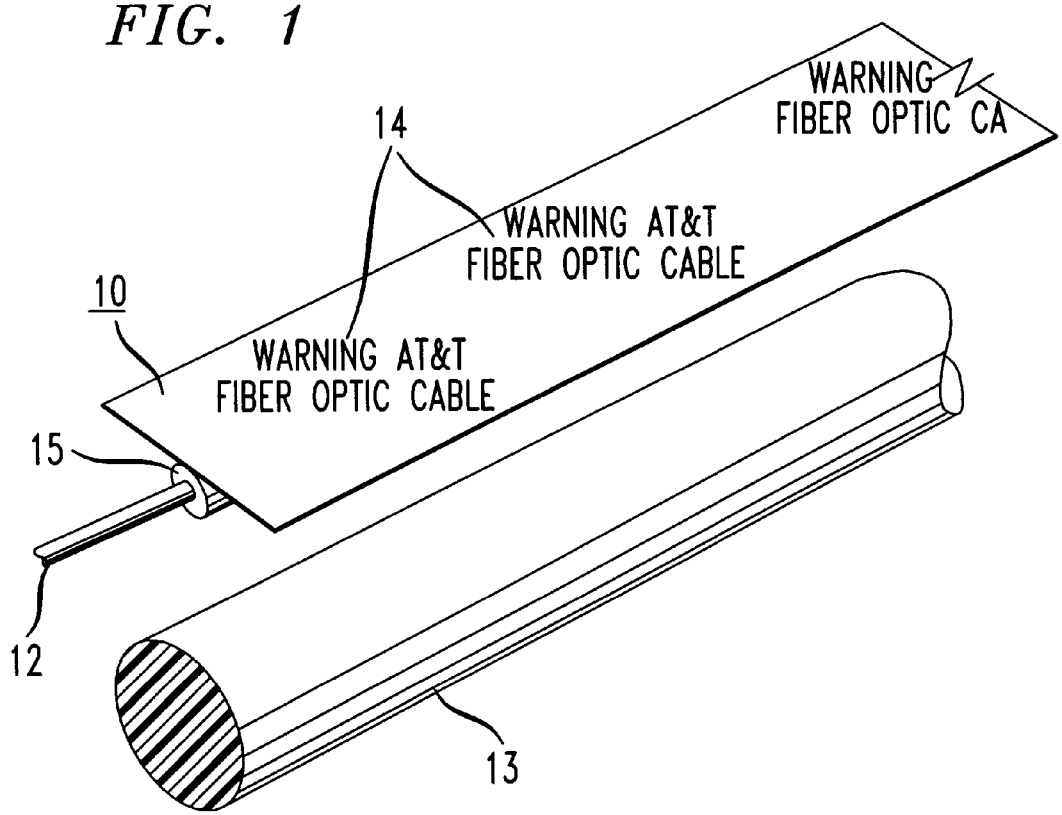
FIG. 1 illustrates a side view, in cross-section of a warning tape in accordance with the invention that incorporates a sacrificial fiber.

FIG. 1 depicts a warning tape 10 incorporating a sacrificial fiber 12 in accordance with the invention for detecting the existence and location of excavation activity in the vicinity of a conveyance 13, such as a fiber optic cable, buried below the tape 10. In practice, the tape 10 is buried a prescribed distance (e.g., 2–3 feet) above the conveyance 13. The warning tape 10 is made from an impervious ribbon-like material such as vinyl or plastic or the like and is imprinted with a warning message 14 on one of its two sides. In accordance with the present invention, a protective casing 15, made from a strong impervious material such as a KEVLAR strength member is affixed to the tape 10 opposite the side that carries the warning 14 for enclosing the sacrificial fiber 12.

In contrast to the conveyance 13, which may comprise a fiber-optic cable whose fiber(s) (not shown) carry actual traffic, the fiber 12 carries no traffic. As discussed in greater detail below with respect to FIG. 2, the fiber 12 carries a monitoring signal that is examined for the purpose of determining the existence and location of possible excavation near the buried conveyance 13.

Figure 2:
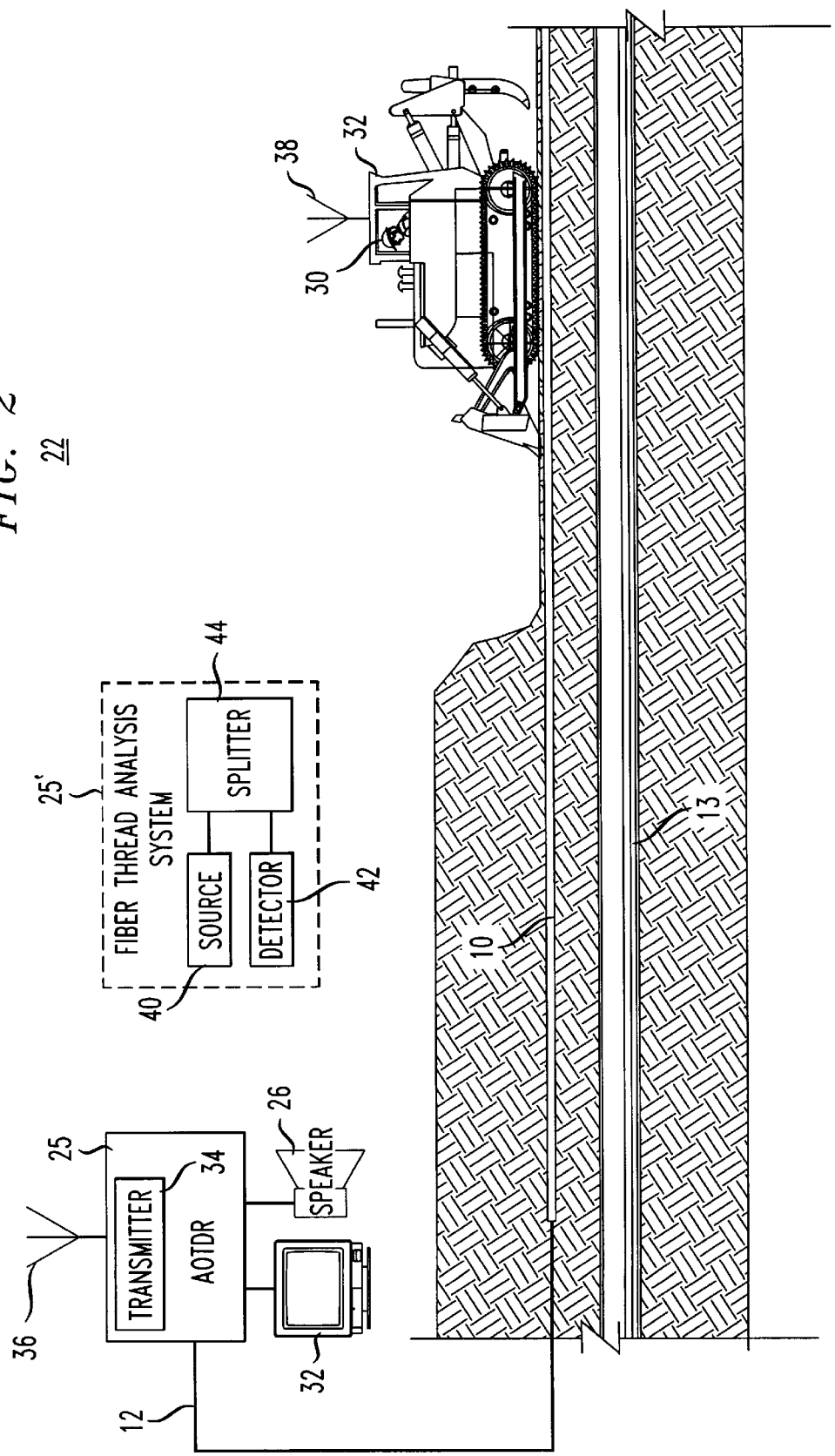
FIG. 2 illustrates a block schematic diagram of a system that incorporates the warning tape of FIG. 1 for detecting the existence and location of excavation near a buried utility conveyance.

FIG. 2 depicts a system 22 in accordance with the invention that utilizes the warning tape 10 to provide a warning of the possible existence and location of excavation in the vicinity of the conveyance 13. In one embodiment, the system 22 includes an Automatic Optical Time Domain Reflectometer (AOTDR) 25, typically located at a central facility, for connection to one end of the sacrificial fiber 12. The AOTDR 25 serves to transmit a monitoring signal onto the fiber 12 and to detect the reflection of that signal back from the open end of the fiber. As long as the fiber 12 on the tape remains undisturbed, the AOTDR will detect a reflection at prescribed time.

In case of excavation near the conveyance 13 such that the fiber 12 suffers break or a microbend, the AOTDR 25 will sense a reflection of the monitoring signal at different time. The occurrence of a reflection in the monitoring signal at a different time indicates possible excavation. The difference in time between the quiescent reflected signal and the reflected signal associated with a fiber break or microbend corresponds to the location on the fiber where such a break or microbend occurred. Upon detecting such a break or microbend in the fiber, the AOTDR 25 triggers an alarm, typically a visual and/or audible alert, provided by a warning device such as a flashing light or a speaker, respectively 26 that may be located along the path of the buried conveyance 13. In this way, the warning device 26 can alert an operator 30 of a piece of excavating equipment 32, such as a bulldozer, of the existence of the buried conveyance 13 in the event the operator does not see the tape 10.

In addition to the warning device 26, the system 22 may include a display device 32 coupled to the AOTDR 25. The display device 32 displays the location of the break or microbend in the fiber 12, as determined by the AOTDR 25 in accordance with the difference in time between the quiescent reflected signal (with no break or microbend) and the reflected signal associated with such a fiber break or microbend. Knowing the location of the break or microbend allows the conveyance owner to dispatch personnel to the site of the excavation that caused the fiber break or microbend.

Preferably, the AOTDR 25 resides at a central facility maintained by the conveyance owner so that the conveyance owner can receive an immediate indication of the exact location of such potential excavation activity. While the AOTDR 25 remains at the central facility, it may be desirable to provide the excavation operator 30 with information from the AOTDR. To that end, it may be desirable to provide the AOTDR 25 with a transmitter 34 for broadcasting such information via an antenna 36 for receipt at the piece of excavation equipment via an antenna 38. In this way, the operator 30 can receive an alert immediately of any damage to the sacrificial fiber 12 so that the excavation can be stopped before any damage is done to the buried utility conveyance 23. The alert may be a visual alert displayed on a view screen, an audible alert, or a combination thereof, provided via a device (not shown) within the piece of excavating equipment 32.

As discussed above, using the AODR 25 as the monitoring device allows the conveyance owner to establish the existence and location of potential excavation by detecting a break or microbend in the fiber 12. However, a contractor excavating in vicinity of the conveyance 13 may not cause a microbend or break in the fiber 12, but could conceivably damage the conveyance 13. For that reason, the owner of the conveyance 13 may want to detect possible intrusion of the fiber 12 caused by vibrations due to the movement of heavy equipment on the earth thereabove. To detect such intrusion, a Fiber Threat Analysis System (FTAS) 25' of the type disclosed in U.S. Pat. No. 4,904,050 (incorporated by reference herein), could be substituted for the AOTDR 25. The FTAS 25' includes a source of optical power 40, such as a laser, and an optical detector 42, such as an interferometer, coupled to a first and second ports of a four-port splitter 44 whose remaining two ports are coupled to the two ends, respectively of the fiber 12 on the warning tape 10.

The splitter 44 splits a portion of the beam from the optical power source 40 into the fiber 12 and into the detector 42. At the same time, the splitter 44 combines the beam transmitted through the fiber with the beam from the power source 40. In case of any intrusion to the fiber 12, the phase of the beams transmitted into, and exiting from the fiber, respectively, will differ. Thus, the detector 44 can detect an intrusion in accordance with the phase difference between the transmitted and received beams. The degree of phase different may indicate the possible location of such activity.

The above-described embodiments are merely illustrative of the principles of the invention. Those skilled in the art may make various modifications and changes, which will embody the principles of the invention and fall within the spirit and scope thereof.

What is claimed is:

1. A method for providing an alert of possible excavation in the vicinity of an existing underground utility conveyance, comprising the steps of:
    (a) placing a warning tape containing a sacrificial optical fiber proximate to said existing underground utility conveyance;
    (b) providing an optical monitoring signal on said sacrificial fiber and detecting a variation in said optical monitoring signal indicative of possible excavation activity in the vicinity of said warning tape; and
    (c) generating an alert in response to a variation in the optical monitoring signal carried by said warning tape.

2. The method according to claim 1 wherein the alert is a visual alert.

3. The method according to claim 1 wherein the alert is an audible alert.

4. The method according to claim 1 wherein the alert comprises the combination of an audible and visual alert.

5. The method according to claim 1 wherein the alert comprises information pertaining to the location of the damage to the sacrificial fiber.

6. An apparatus for providing an alert during an excavation when the excavation is within a minimum allowable separation distance from an existing underground utility conveyance, comprising:
    (a) a warning tape containing a sacrificial optical fiber buried proximate to the underground utility conveyance;
    (b) means providing an optical monitoring signal on said optical fiber and for detecting a variation in said optical monitoring signal carried by said sacrificial optical fiber indicative of possible excavation activity in the vicinity of said warning tape; and,
    (c) means for generating an alert to indicate that said sacrificial optical fiber has been damaged.

7. The apparatus of claim 6 wherein said warning tape is a plastic ribbon or the like carrying an indica identifying said underground utility conveyance.

8. The apparatus of claim 6 wherein said detecting means is an Automatic Optical Time Domain Reflectometer (AOTDR).

9. The apparatus of claim 6 wherein said detecting means comprises a fiber threat analysis system for providing a monitoring signal and for detecting any difference in phase between the monitoring signal transmitted into the fiber and the monitoring signal exiting the fiber.

10. The apparatus of claim 6 wherein said alert generating means generates an audible alert.

11. The apparatus according to claim 6 wherein said alert generating means generates a visual alert.

* * * * *